United States Patent [19]
Ort et al.

[11] 3,824,610
[45] July 16, 1974

[54] CAMERA ADAPTED FOR PERCUSSIVELY IGNITABLE FLASHLAMPS

[75] Inventors: Wolfgang Ort, Stuttgart-Bad Canstatt; Michael Reibl, Sindelfingen, both of Germany

[73] Assignee: Eastman Kodak Company, Rochester, N.Y.

[22] Filed: Dec. 14, 1972

[21] Appl. No.: 315,053

[52] U.S. Cl. ............................. 354/139, 354/142
[51] Int. Cl. ........................................... G03b 15/04
[58] Field of Search ...................... 95/11.5 R, 11 L

[56] References Cited
UNITED STATES PATENTS

| | | | |
|---|---|---|---|
| 3,624,726 | 11/1971 | Horton et al. | 95/11 R |
| 3,677,157 | 7/1972 | Sturm | 95/11.5 R |
| 3,690,236 | 9/1972 | Ettischer | 95/11.5 R |
| 3,714,874 | 2/1973 | Engelsmann et al. | 95/11.5 R |
| 3,719,126 | 3/1973 | Engelsmann et al. | 95/11.5 R |

*Primary Examiner*—Samuel S. Matthews
*Assistant Examiner*—Kenneth C. Hutchison
*Attorney, Agent, or Firm*—R. F. Brothers

[57] ABSTRACT

Camera includes a control member which is movable to actuate the flash firing and flash indexing mechanisms whenever a flash unit is coupled to the camera. In a preferred embodiment, the flash firing member blocks movement of the control member and is moved to an unblocking position when a flash unit is inserted in the camera socket. In an alternate embodiment, a separate latching lever impedes movement of the control member and is moved to an unlatched position when a flash unit is inserted in the camera socket.

7 Claims, 4 Drawing Figures

CAMERA ADAPTED FOR PERCUSSIVELY IGNITABLE FLASHLAMPS

BACKGROUND OF THE INVENTION

1. Field of the Invention

The present invention relates generally to photographic apparatus and in particular to cameras adapted for actuating a flash firing device.

2. Description of the Prior Art

In order to overcome various well known problems with electrical flashlamps, photographic apparatus has recently been developed which is adapted for use with mechanically firable flashlamps that are actuated by percussive impact. An example of such apparatus is illustrated in U.S. Pat. No. 3,630,129. In this camera, the drive element for the flash firing mechanism and the flash socket indexing mechanism is also utilized as a shutter driving member. The drive element is cocked during each winding of the camera and is released each time the camera body release is actuated, causing actuation of the flash firing and indexing mechanisms as well as driving the shutter, regardless of whether a daylight exposure or flash exposure is to be made. Other examples of such apparatus are illustrated in U.S. Pat. No. 3,677,157 and 3,646,864, in each of which means are provided for uncoupling the drive element from the flash firing mechanism during daylight mode operation. However, the drive element is released for movement to its uncocked position regardless of whether such movement is coupled to the flash firing mechanism. Thus, when a daylight exposure is being made with no flash unit inserted in the flash socket, a portion of the energy which is stored to drive the drive element will be wasted. The wasted energy may be a considerable portion of the total stored energy because a relatively high amount of energy is necessary to insure proper operation of the flashlamp firing mechanism. Moreover, unnecessary movement of the drive element will cause excessive wear and possibly movement of the camera during exposure. It would be desirable to have a mechanism which does not waste this energy nor cause unnecessary wear or movement of camera parts during daylight mode operation of the camera but retains the energy in storage for subsequent use during flash mode operation of the camera. Such a mechanism would also be desirable for use in a camera having a striker which is releasable to impact upon a piezoelectric crystal and thereby generate electrical energy to fire a flashlamp. When no flashlamp is present, continued striker impact could cause excessive wear of the piezoelectric crystal as well as possible movement of the camera.

SUMMARY OF THE INVENTION

Accordingly, an object of the present invention is to provide an improved mechanism for the efficient use of energy stored during the cocking operation of the camera.

Another object of this invention is to provide such an improved mechanism which completely releases its stored energy only during flash mode operation of the camera.

Still another object of the invention is to provide such an improved mechanism which prevents actuation of the flash firing and flash indexing mechanisms during daylight mode operation of the camera.

Still a further object of the invention is to provide such an improved mechanism which actuates the flash firing and flash socket indexing mechanisms only during flash mode operation of the camera.

These and other objects are achieved by the present invention which provide a control member which is movable to actuate the flash firing and socket indexing mechanisms in response to movement of the body release member. A mechanism is provided for terminating movement of the control member prior to actuation of the flash firing and socket indexing mechanisms when no flash unit is coupled to the flash socket. In a preferred embodiment of the invention, a flash firing member blocks movement of the control member when no flash unit is coupled to the flash socket. A rocker arm is provided for moving the flash firing member between its blocking position wherein it terminates movement of the control member and a firing position wherein it actuates the flash device under urging of the control member. The rocker arm moves the firing member to its firing position in response to insertion of a flash unit in the camera socket.

In an alternate embodiment of the invention, movement of the rocker arm in response to insertion of a flash unit in the socket unlatches a blocking member which terminates movement of the control member prior to actuation of the flash firing and socket indexing mechanisms when no flash unit is present.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENT

Because photographic cameras are well known, the present description will be directed in particular to elements forming part of, or cooperating more directly with, an improved mechanism according to the present invention. It is to be understood that elements of photographic cameras not specifically shown or described may take various forms well known to those skilled in the art.

Figure 1:
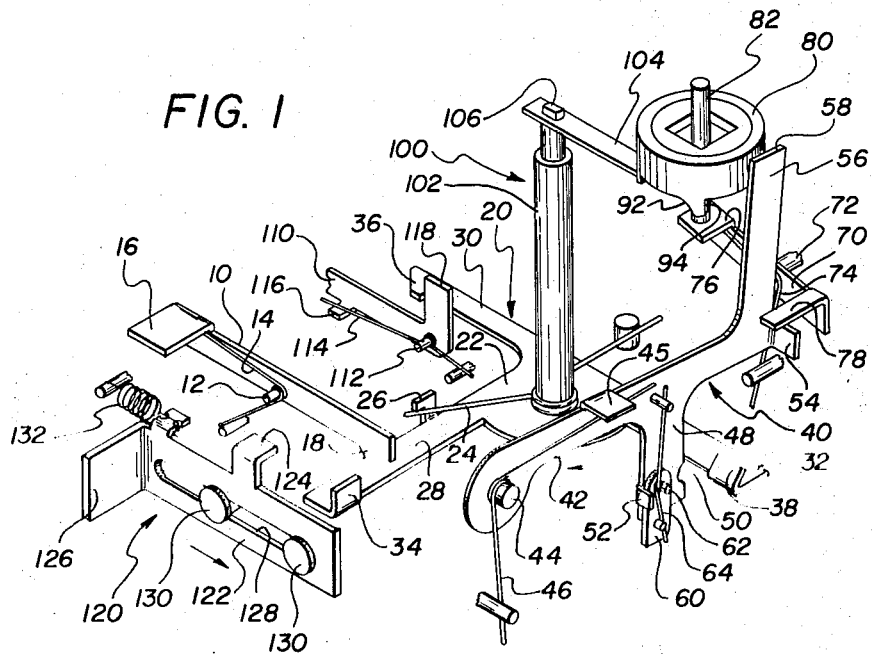
FIG. 1 is a perspective view of the improved mechanism according to this invention in its energized condition just prior to daylight mode operation.

Referring now to FIG. 1, a photographic camera according to this invention comprises a body release member 10, a control mechanism shown generally as 20, a flash firing mechanism shown generally as 40, a rocker arm 70, a flashcube socket 80, a socket indexing mechanism shown generally as 100, a shutter release lever 110, and a camera winding mechanism shown generally as 120. Body release member 10 is movably mounted on a fixed pin 12 and is biased in a clockwise direction by a spring 14. Body release member 10 is elongated in form and has a first tab end 16 which extends externally of the camera frame and is accessible to the camera operator and a second latch end 18.

Control mechanism 20 comprises a control member 22 rotatably mounted within the camera. Control member 22 is biased in a clockwise direction by a spring 24 which engages a tab 26 on control member 22. Control member 22 further includes three elongated control arms 28, 30 and 32. Control arm 28 terminates in an upstanding lug 34. Control arm 30 terminates in a latch end 36. Control arm 32 terminates in a bent-over drive lug 38.

Flash firing mechanism 40 comprises a flash firing member 42 and clutch 60. Flash firing member 42 is rotatably mounted on a pin 44 and is biased for rotation in a counterclockwise direction by a spring 46 which engages a lug 45 on member 42. Firing member 42 includes a downwardly extending control arm 48 defining a recess 50 and having a drive lug 52 extending outwardly therefrom, a control lug 54, and an upwardly extending sensing and firing arm 56 terminating in a sensing and firing end 58. Clutch member 60 is movably mounted on a pin 62 mounted on firing member 42 and is based in a clockwise direction by a spring 64 into engagement with lug 52 on firing member 42.

Rocker arm 70 is rotatably mounted on a fixed pin 72 and is biased in a clockwise direction by a spring 74. Lever 70 is elongated in form, having opposed ends terminating in a sensing surface 76 and a latch lug 78.

Figure 3:
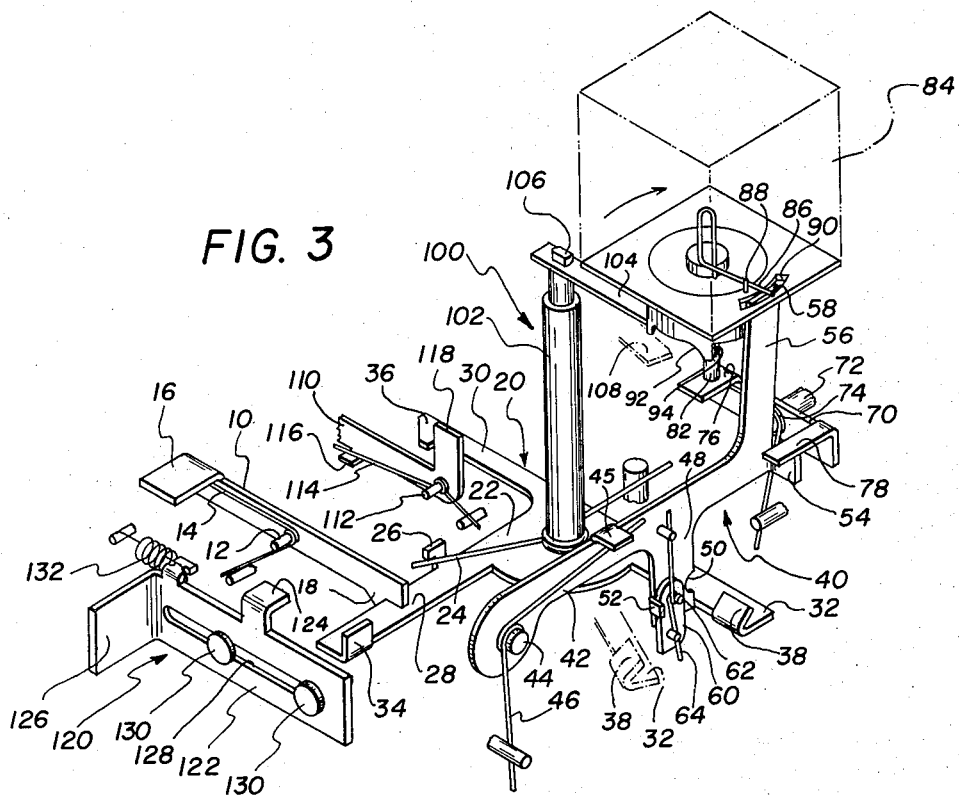
FIG. 3 is the mechanism according to FIG. 1 with a flash unit inserted in the camera socket just prior to flash mode operation of the apparatus.

Socket 80 is of conventional design as is known in the art and includes a sensing arm 82 and means (not illustrated) for receiving and releasably holding a multilamp flash unit 84 illustrated in phantom in FIG. 3. Sensing arm 82 is movable downwardly in response to the insertion of a flash unit 84 in socket 80. Flash unit 84 is preferably of the type which has a plurality of individual flashlamps, each having a pre-energized striker wire 86 associated therewith which is held in an energized position by a fixed pin 88 and is releasable for movement into striking contact with a percussive primer associated with each flashlamp. Flash unit 84 further has an aperture 90 associated with each flashlamp through which firing end 58 of firing member 42 may extend to effect release of a pre-energized striker 86. Socket 80 further has a series of cam surfaces 92 and drive surfaces 94, a cam surface 92 and drive surface 94 being associated with each of the flashlamps within the flash unit 84.

Flash socket indexing mechanism 100 comprises an indexing shaft 102 and an indexing arm 104. Shaft 102 is fixedly mounted on control member 22 for rotational movement therewith and terminates in an upper mounting stud 106. Indexing arm 104 is fixed to mounting stud 106 for movement therewith and terminates in an indexing end 108 which is positioned for engagement with cam surfaces 92 and drive surfaces 94 on socket 80.

Shutter latch 110 is movably mounted on a fixed pin 112 and is biased in a counterclockwise direction by a spring 114 which engages a lug 116 on latch 110. Latch 110 further includes a latch end 118 which is biased into contact with latch end 36 on control member 22. Movement of shutter latch 110 in a counterclockwise direction causes actuating of the shutter mechanism of the camera in any manner which is known in the art.

Camera winding mechanism 120 includes an elongated winding member 122 which has integrally formed therewith a drive lug 124 positioned for movement into contact with lug 34 on control member 22 and further includes an outwardly extending tab 126 which is normally positioned externally of the camera frame and may be actuated by the camera operator. Cocking member 122 further defines an elongated slot 128 by means of which member 122 is movably mounted within the photographic apparatus by fixed pins 130 which extend through a slot 128. It may thus be seen that cocking member 122 may be moved laterally in a linear fashion with pins 130 defining the path of movement of cocking member 122. Cocking member 122 is biased by spring 132 to the position illustrated in the drawings. Member 122 may be moved away from that position against the bias of spring 132 by operator actuation of tab 126.

Referring again to FIG. 1, the apparatus is illustrated in a position for daylight mode actuation. Sensing arm 82 within socket 80 is in its uppermost position and this position is sensed by sensing surface 76 of rocker arm 70, permitting clockwise rotation of rocker arm 70 about pin 72. Latching lug 78 is thus held in contact with lug 54 of firing member 42 and will hold member 42 in a downward position so that end 58 is held down within the camera. Shutter latch 110 is held in a latched position with end 118 in engagement with latch end 36. Body release member 10 is in its latched position with latch end 18 engaging arm 28 of control member 22 and holding control member 22 in its counterclockwise position.

Figure 2:
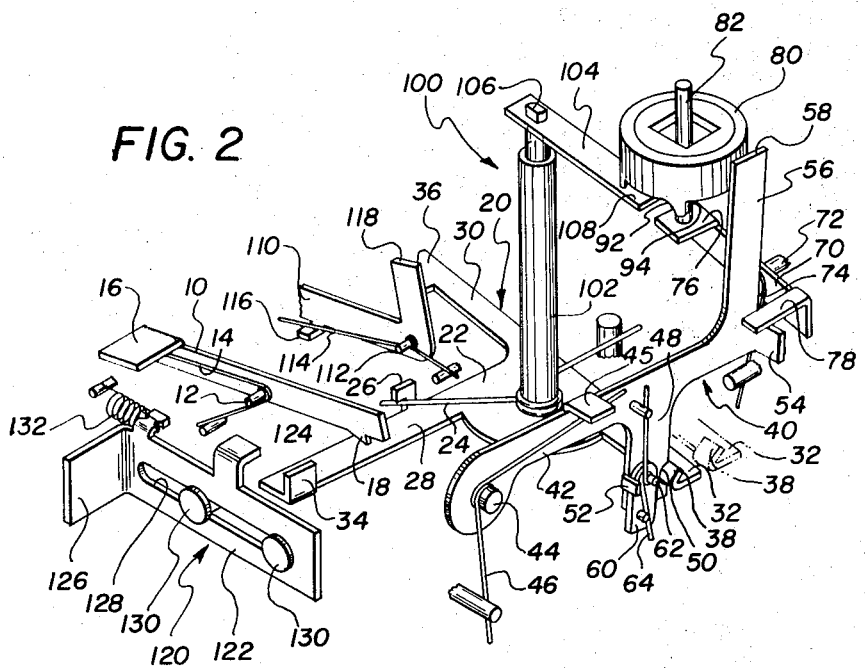
FIG. 2 is a perspective view of the mechanism according to FIG. 1 after daylight mode operation of the apparatus.

Camera operation is now initiated by the operator depressing tab 16, causing counterclockwise rotation of body release member 10. Latch end 18 is thus rotated out of engagement with arm 28 on control member 22 as may best be seen within FIG. 2. Control member 22 is thus free to rotate in a clockwise direction under the urging of spring 24. Such movement will be initiated but will continue for only a short distance as drive lug 38 on control arm 22 will be brought into engagement with recess 50 on firing member 42. However, the amount of rotation will be sufficient to unlatch latch end 36 from engagement with end 118 on shutter release latch 110, thereby permitting shutter lever 110 to rotate so as to cause actuation of the camera shutter mechanism. However, the flash firing mechanism will not be actuated since drive lug 38 engages recess 50 and the flash indexing mechanism will not be actuated since indexing end 108 will not move a sufficient distance to cause indexing of socket 80. In this mode of operation, the energy contained within energized spring 24 will not be completely utilized because of the engagement of drive lug 38 with recess 50.

Energizing of the camera mechanisms may now be achieved by operator actuation of tab 126 causing linear movement of winding member 122. Lug 124 will come into engagement with lug 34 on arm 28 and will cause counterclockwise rotation of control member 22. Rotation will continue until latch end 18 moves back into engagement with arm 28 under the bias of spring 14. Simultaneously, latch end 36 will be moved back into engagement with latch end 118 of shutter lever 110, thereby rotating shutter lever 110 to its latching position. Drive lug 38 will be removed from recess 50 on firing member 42. The mechanism will now be as illustrated once again in FIG. 1 and ready for the next operation of the camera.

For flash mode operation, a flash unit 84 is coupled to socket 80, causing downward movement of arm 82.

This movement is transmitted to sensing surface 76 and causes rotation of rocker arm 70 in a counterclockwise direction. Movement of rocker arm 70 permits movement of firing arm 56 so that firing end 58 will extend through a properly positioned aperture 90 within flash unit 84. Upward movement will continue until end 58 comes into non-releasing contact with a pre-energized striker 86. Recess 50 will now have been moved out of the path of movement of drive lug 38 on control member 22.

Camera operation is again initiated by the operator depressing tab 16, thereby freeing latch end 18 from engagement with arm 28. Control member 22 again begins to rotate under the bias of spring 24. However, movement of firing member 42 has moved recess 50 out of the path of movement of drive lug 38 on control arm 22. Therefore, control member 22 is free to rotate under the bias of spring 24. Simulteneously, latch end 36 is removed from engagement with latch end 118 of shutter release latch 110, thereby permitting actuation of the shutter mechanism of the camera. Drive lug 38 of drive arm 32 is moved into engagement with clutch 60 and thereby causing upward movement of arm 56 on firing member 42 until contacted pre-energized striker 86 is released for movement into impact with the percussive element of a flashlamp. Alternatively, arm 56 could be utilized to release a striker for movement into impact against the piezoelectric crystal to generate electric energy to fire the flashlamp. Thus, with a flash unit coupled to the camera socket, control member 22 utilizes the entire energy stored within spring 24 for simultaneous actuation of the shutter mechanism and firing of the flashlamp. Rotation of control member 22 also rotates shaft 102 and indexing arm 104, bring indexing end 108 into engagement with cam surface 92 until end 108 reaches the position shown in phantom in FIG. 3.

Cocking of the camera mechanism is again achieved by operator actuation of tab 126 causing linear movement of cocking member 122 against the bias of spring 132. Lug 124 is brought into contact with lug 34 causing counterclockwise rotation of control member 22 until latch end 18 comes into engagement with arm 28. Simultaneously, latch 36 is brought into engagement with latch end 118 of shutter release latch 110. Drive lug 38 is brought back into engagement with clutch 60, which is free to move against the bias of spring 64 upon return movement of arm 32 until arm 32 has returned to its initial position as illustrated in FIG. 3. Indexing arm 104 causes indexing of socket 80 by means of indexing end 108 coming into engagement with drive surface 94 on the socket during its movement in simultaneous rotation with control member 22. The camera mechanism has now been returned to the position illustrated in FIG. 3 and is ready for subsequent flash mode operation of the camera.

Figure 4:
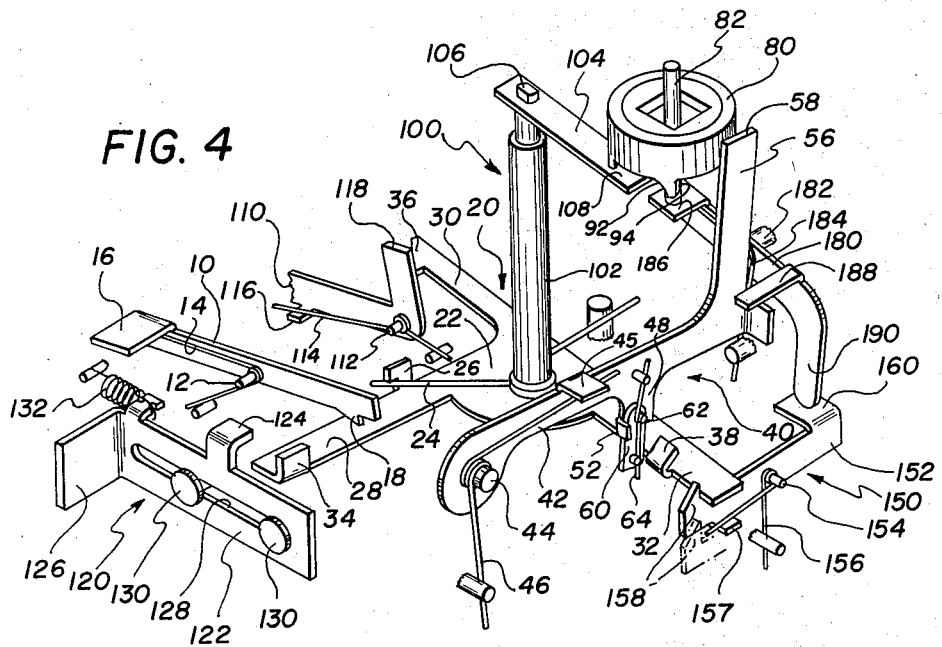
FIG. 4 is an alternate embodiment of the mechanism according to the present invention illustrated after daylight mode operation.

An alternate embodiment of the mechanism of the present invention is illustrated in FIG. 4. In this Figures the body release 10, control mechanism 20, socket 80, flash indexing mechanism 100, shutter release latch 110 and winding mechanism 120 are identical with those illustrated in FIGS. 1 through 3. Sensing and firing mechanism 40 is identical with that illustrated in FIGS. 1 through 3 with the exception that firing member 42 no longer defines a recess 50 as illustrated in those Figures. In this embodiment, a separate latching mechanism 150 is provided for latching flash sensing and firing mechanism 40 during daylight mode operation of the camera. A latch member 152 is pivotally mounted on a fixed pin 154 and is biased in a counterclockwise direction by a spring 156 engaging lug 157 on member 152. Latch member 152 has opposed ends which terminate in latch end 158 and an engaging surface 160.

Rocker arm 180 is pivotally mounted on a fixed pin 182 and is biased in a clockwise direction by a spring 184. Arm 180 has a sensing surface 186 which is positioned in engagement with sensing arm 82 of socket 80. Rocker arm 180 also has a latching lug 188 which is positioned in engagement with lug 54 on firing member 42. Rocker arm 180 further has an elongated unlatching arm 190, which extends into contact with engaging surface 160 on latch member 152.

During daylight operation of the camera without a flash unit coupled to socket 80, sensing arm 82 is in its upward position and this position is sensed by sensing surface 186 of rocker arm 180. Rocker arm 180 is moved to its clockwise position under the bias of spring 184 with arm 190 in contact with engaging surface 160 and maintaining latch member 152 in its clockwise position as illustrated in FIG. 4. When control member 22 rotates under the bias of spring 24 after actuation of body release 10 by the operator, arm 32 will come into contact with latch end 158, thereby terminating movement of control member 22. Rotational movement of control member 22 is sufficient to permit actuation of the camera shutter mechanism by unlatching shutter release lever 110. However, the amount of movement is not sufficient to cause actuation of flash firing mechanism 40 or flash indexing mechanism 110.

Flash mode operation is automatically insured when a flash unit is coupled to socket 80. Arm 82 is moved to its downward position, thereby causing rotation of rocker arm 180 against the bias of spring 184 and moving unlatching arm 190 in an upward direction. Latch member 152 is now free for movement in a counterclockwise direction with engaging surface 160 maintaining contact with unlatching arm 190. Latch end 158 is now moved out of the path of movement of arm 32 of control member 22, as is illustrated in phantom in FIG. 4. Upon actuation of body release lever 10, member 22 is free to rotate to its full extent, causing simultaneous unlatching of the shutter actuating mechanism by shutter release lever 110 and actuating of flash firing mechanism 40 by engagement of drive lug 38 with clutch 60.

This invention has been described in detail with particular reference to a preferred embodiment thereof, but it will be understood that variations and modifications can be effected within the spirit and scope of the invention.

We claim:
1. In a camera having a shutter and means for receiving a flash unit, a shutter and flash actuating mechanism comprising:
   means for operating said shutter;
   means for operating said flash unit;
   means for actuating said shutter operating means and said flash unit operating means, said actuating means including a control member movable from a first position through a second position for actuating said shutter operating means to a third position for actuating said flash unit operating means;

means for blocking said control member to prevent movement of said control member from said second position to said third position, said blocking means movable to an unblocking position; and means for moving said blocking means to said unblocking position in response to receipt of a flash unit by said receiving means.

2. In a camera having a shutter and means for receiving a flashlamp unit of the type having a lamp firable by striking and further having a pre-energized striker releasable to effect such firing, a shutter and flash actuating mechanism comprising:

means for operating said shutter;
means for releasing such a pre-energized striker;
means for actuating said shutter operating means and said releasing means, said actuating means including a control member movable through a first position for actuating said shutter operating means to a second position for actuating said releasing means;
means for blocking said control member to prevent movement said from said first position to second position, said blocking means being movable to an unblocking position; and
means for moving said blocking means to said unblocking position in response to receipt of a flashlamp unit by said receiving means, thereby permitting movement of said control member to said second position.

3. In a camera having a shutter and means for receiving a flashlamp unit of the type having a lamp firable by striking and a pre-energized striker releasable to effect such striking, a shutter and flash actuating mechanism comprising:

means for operating said shutter;
means, including a firing member movable into contact with such a pre-energized striker, for releasing the contacted pre-energized striker;
a control member movable to a first position for actuating said shutter operating means and further movable from said first position to a second position for actuating said releasing means;
means for blocking movement of said control member from said first position to said second position; and
means coupled to said receiving means for moving said blocking means to an unblocking position in response to receipt of a flashlamp unit by said receiving means.

4. In a camera having a shutter and means for receiving a flashlamp unit of the type having a lamp firable by striking and a pre-energized striker releasable to effect such striking, a shutter and flash actuating mechanism comprising:

means for operating said shutter;
a firing member movable from a first to a second position for releasing such a pre-energized striker;
a control member movable to a first position for actuating said shutter operating means and further movable to a second position;
means coupling said control member and said firing member for moving said firing member to said second position in response to movement of said control member to said second position;
means for blocking movement of said control member from said first position to said second position; and means coupled to said receiving means for moving said blocking means to an unblocking position upon receipt of a flashlamp unit by said receiving means.

5. In a camera having a shutter and means for receiving a flashlamp unit of the type having a lamp fireable by striking and a pre-energized striker releasable to effect such firing, a shutter and flash actuating mechanism comprising:

means for operating said shutter;
a firing member movable from a first position into a second position in contact with such a striker and further movable to a third position to effect release of the contacted pre-energized striker;
a control member movable to a first position to actuate said shutter operating means and further movable to a second position for engaging and moving said firing member to said third position, said control member being blocked from moving from said first position to said second position by said firing member whenever said firing member is in said first position; and
means coupled to said receiving means for moving said firing member to said second position to unblock said control member in response to receipt of a flashlamp unit by said receiving means.

6. In a camera having a shutter and means for receiving a flash unit of the type having a lamp firable by striking and a pre-energized striker releasable to effect such firing, a shutter and flash actuating mechanism comprising:

means for operating said shutter;
a control member movable to a first position to actuate said shutter operating means and further movable to a second position for flash firing;
a firing element movable from a blocking position wherein said firing element blocks movement of said control member from said first position to said second position to a contact position wherein said firing element is in non-releasing contact with a pre-energized striker and further movable to a release position to effect release of the contacted pre-energized striker; and
means coupled to said receiving means for moving said firing member element from said blocking position to said contact position to unblock said control member in response to receipt of a flash unit by said receiving means.

7. In a camera having a shutter and means for receiving a flash unit of the type having a lamp firable by striking and a pre-energized striker releasable to effect such firing, a shutter and flash firing mechanism comprising:

means for operating said shutter;
means for releasing such a pre-energized striker;
a control member movable through a first position for actuating said shutter operating means to a second position for actuating said releasing means;
means, including a latch member, for blocking movement of said control member from said first position to said second position; and
means coupled to said blocking means for unlatching said latch member in response to receipt of a flash unit by said receiving means.

* * * * *

PO-1050
(5/69)

UNITED STATES PATENT OFFICE
CERTIFICATE OF CORRECTION

Patent No. 3,824,610     Dated July 16, 1974

Inventor(s) W. Ort    M. Reibl

It is certified that error appears in the above-identified patent and that said Letters Patent are hereby corrected as shown below:

Column 7, line 4    after "means" insert --being--

Column 7, line 22    after "movement" delete "said"

Column 7, line 22    after "to" insert --said--

Column 8, line 46    after "firing" delete "member"

Signed and sealed this 3rd day of December 1974.

(SEAL)
Attest:

McCOY M. GIBSON JR.
Attesting Officer

C. MARSHALL DANN
Commissioner of Patents